May 16, 1961 J. C. CLARK 2,984,432
FISHING REEL

Filed Oct. 30, 1957 2 Sheets-Sheet 1

INVENTOR.
JOSEPH C. CLARK
BY George H. Baldwin
ATTORNEY

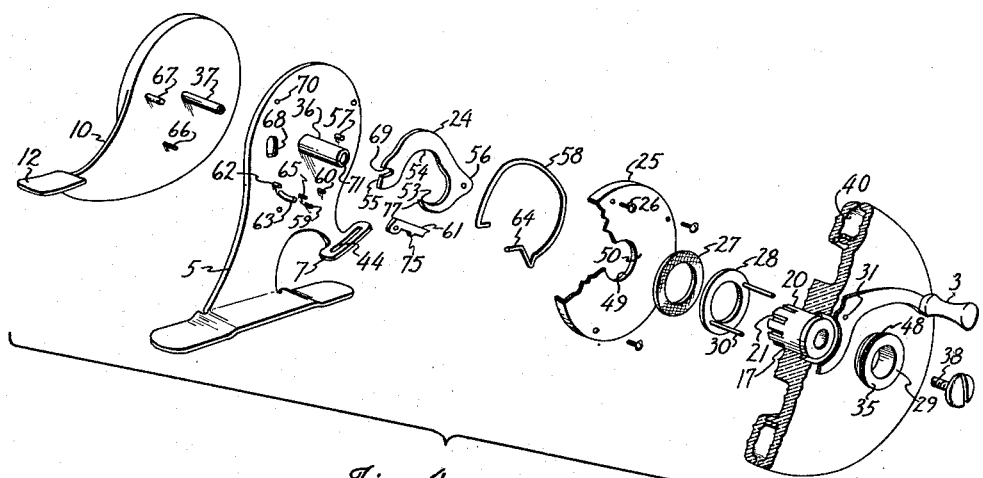

United States Patent Office 2,984,432
Patented May 16, 1961

2,984,432

FISHING REEL

Joseph C. Clark, 4843 Backacher Lane, Orlando, Fla.

Filed Oct. 30, 1957, Ser. No. 693,405

2 Claims. (Cl. 242—84.51)

This invention pertains to fishing reels, and particularly to a direct drive reel.

A general object of the invention is to provide an improved fishing reel.

More specific objects of the invention are to improve the braking arrangements of fishing reels, to provide an improved drag mechanism, to embody in a smaller space an improved ratchet or clicker and lock mechanism and brake mechanism and to provide a convenient thumb-operated lever for controlling the ratcheting, locking and braking mechanisms, to improve the overall appearance of fishing reels, to embody in a reel a drag arrangement operable separately from and independently of the clicker, lock and brake mechanism, to provide spool and line guide arrangements which provide satisfactory winding of the line without any movable level wind mechanism, to decrease the tendency to backlash, and to provide spool arrangements wherein the line wound on the spool is housed at all times.

A further object is to embody the improvements and features outlined above in a compact reel of simple and sturdy construction and attractive appearance, which is resistant to damage from abuse, and which is readily disassembleable.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

Fig. 4 is an exploded perspective view of the reel;

Fig. 5 is a front elevation of the reel with the spool and certain other portions removed, and with the spool hub shown in section, demonstrating details of the brake, clicker and lock mechanism and the operation thereof;

Figures 6, 7 and 8 are enlarged fragmentary views showing a mechanism of Fig. 5 in changed positions;

Figure 1:
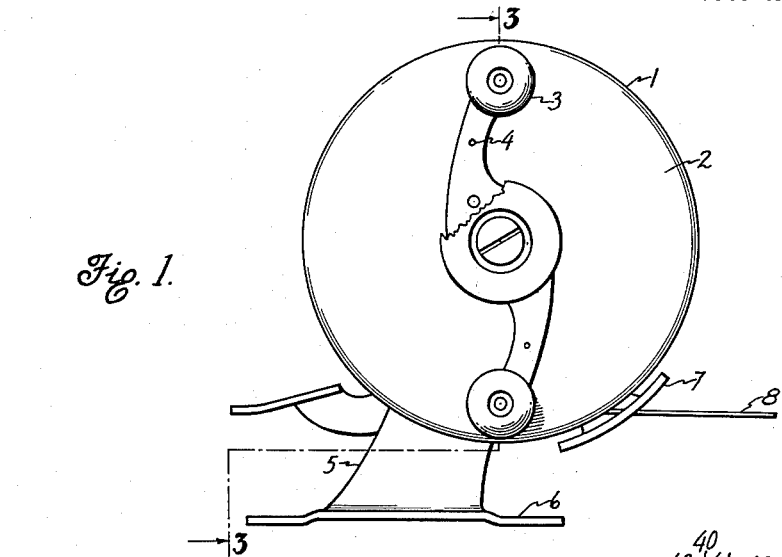
Fig. 1 is a front elevation.
Figure 2:
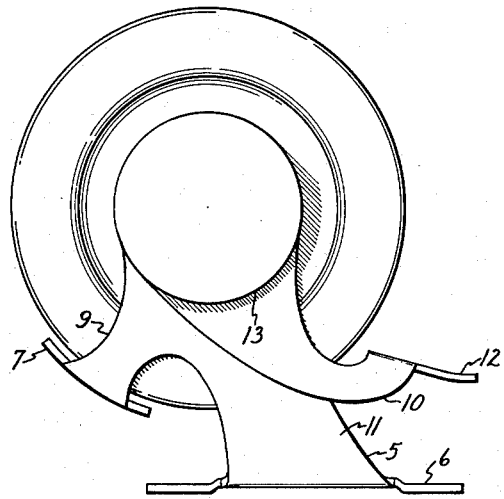
Fig. 2 is a back elevation of a reel embodying the invention.

The reel as seen in Fig. 1 comprises a spool 1 with a front side 2 to which handles 3 are affixed, such as by a screw 4. The spool is mounted for rotation on a base and supporting plate member 5 of which the lower portion 6 is arranged for attachment in the usual manner to the fishing rod. A fixed line guide 7 is disposed adjacent the lower periphery of the spool. The line 8 passes through a slot in guide 7 toward the tip of the rod. The line guide is integrally connected with plate 5 by means of a web 9, as best seen in Fig. 2.

Thumb operated lever 10 lies adjacent the back face 11 of plate 5, terminating in a thumb pad or key 12 extending toward the handle end of the rod and adjacent and just above the handle to be readily accessible to the thumb of the user. The lever swings through a few degrees of arc about the rotational axis of spool 1. Lever 10 further comprises a portion 13 of increased thickness for the connecting thereto of pins and a mounting spindle as later explained.

Figure 3:
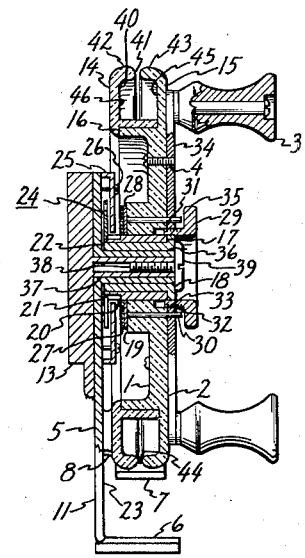
Fig. 3 is a partially broken away and partially sectional view of the reel taken approximately along line 3—3 of Fig. 1.

As best seen in Fig. 3, the spool 1, which is preferably formed of a molded plastic material, and which, for convenience in manufacture, may be made up of two pieces 14 and 15 glued or otherwise permanently joined as at 16, is carried by a generally cylindrical metal wear resistant hub 17 having a coaxial portion 18 molded integral with the spool 2 for providing a low friction bearing for the rotation thereof. The hub 17 projects from the back face 19 of the spool and the generally cylindrical projecting hub surface 20 has clicker and lock notches 21 formed therein. The hub terminates at 22 immediately adjacent the front face 23 of plate 5, and a clicker, lock and brake mechanism hereinafter further shown and described includes a clicker, lock and brake yoke member 24 engageable with portion 20 of the hub and disposed within a stationary protecting cup 25. The cup is mounted by means of screws, such as screw 26, to plate 5, and serves as a stationary drag plate against which an annular friction drag element 27, of felt or other friction material, may be urged by an annular metal drag disc 28. Disc 28 is arranged to rotate with spool 1.

Drag disc 28 is urged toward cup 25 by a drag adjusting hand wheel 29. Two or more rods, such as rod 30, are fixed to disc 28 and extend in a close but free sliding fit through openings, such as opening 31, in the spool. Hollow hand wheel 29 is externally screw threaded at 32 and threads into a central opening 33 formed in the metal handle strap 34. As the hand wheel is screwed in, its flange 35 engages the disc rods and forces the disc 28 away from the spool and toward the cup 25, thereby to apply frictional drag resistance between the disc and the stationary drag surface provided by the cup 25.

A journal post 36 is fixed to the support plate 5 and extends from its front face 23 into the bearing formed by the hub 17 to support the reel and to establish an axis of rotation thereof. Post 36 is hollow, and thumb lever 10 carries a hollow spindle 37 which fits within post 36 and which, in turn, receives a screw 38 having enlarged head 39. The head of the screw serves as a thrust head and retainer to hold spool 1 on post 36 and to hold lever 10 against plate 5. Upon removal of screw 38, lever 10 may be removed from the back side of plate 5 and spool 1, together with drag disc 28, from the front side.

The spool comprises an annular, line-receiving chamber 40 into which the line enters through a narrow slit 41 which is provided between the outer spool casing wall sections 42 and 43. Guide 7 comprises a slot 44 aligned with slit 41. The chamber 40 being narrow, it has been found that the line entering through the slit 41, which is disposed centrally between the side walls 45 and 46 of the chamber, winds back and forth on the spool filling the chamber sufficiently evenly from side to side to insure against bunching and tangling.

Further details of the construction will be apparent from Fig. 4, wherein the rearwardly projecting hub surface portion 20 is seen to have several spaced pawl-receiving notches, such as notch 21, extending longitudinally along the hub surface. Each notch is formed with at least one flat, radially extending side and each notch is preferably and conveniently made substantially rectangular. Drag disc 28 and friction disc 27 slide onto the projecting portion of the hub, the push rods of the disc 28 passing through openings in the spool, such as opening 31, to be contactable by flange 35 of hand wheel 29. The outer edge 48 of the hand wheel flange is preferably knurled or roughened for gripping by the fingers of the user.

The projecting portion of the hub further passes through central opening 49 of cup member 25, and it will be apparent that the drag-applying, pressure disc 28 may be forced into friction drag contact through the friction disc 27 with the stationary friction surface area designated generally at 50 surrounding opening 49 of the cup member.

The cup 25 mounts by means of small screws, such as screw 26, to plate 5 and encloses, between it and the plate, elements of the brake, clicker and drag arrangements. As heretofore noted, the notched projecting hub portion 20 enters through cup opening 49. Inside the cup, partially surrounding this portion of the hub, is a clicker, brake and lock yoke member 24, having a clicker and lock pawl arm portion 53, a braking arm portion 54, a control knob caging portion 55 and an apertured pivot-pin-receiving portion 56. Member 24 is mounted on pivot pin 57 which extends outwardly from the front face of plate 5 at a point spaced from journal post 36. The yoke member arms are disposed on opposite sides of and bracket the hub, whereby rocking of the yoke on its pivot 57 brings one or the other arm alternatively and selectively into, or toward, engagement with the hub. A spring 58 is anchored, by means of pins 59 and 60, to plate 5 and generally surrounds member 24, urging the member to pivot in a clockwise direction about pin 57, thus tending to move brake arm 54 away from the hub surface and tending to swing pawl arm 53 toward engagement with the hub.

A detent element 61 is also disposed within cup 25, being pivotally mounted on a pin 62 adjacent a slot or elongated aperture 63 in plate 5 and being influenced by contact with a detent actuating spring 64, which, in turn, is conveniently formed integral with the spring member 58 as shown. A detent stop pin 65 is provided on plate 5 as later described.

A detent-engageable pin 66 and a clicker, brake and lock member control pin 67 extend forwardly from lever 10, passing respectively through slotted apertures 63 and 68 of plate 5. Each of apertures are seen to be elongated along respective arcs about the axis of spindle 36, whereby swinging of the lever moves pins 66 and 67 along the respective apertures. Pin 67 is caged within notch 69 formed in the end portion 55 of arm 54, either closely or with a small amount of play or lost motion. The reel is assembled and held together, after the elements within the cup are in place and after the cup screws 26 are threaded into the screw holes, such as hole 70, of plate 5, by passing spindle 37 into bore 71 of journal post 36 and positioning hub 17 on post 36, and by then threading screw 38 into spindle 37. Hand wheel 29 is separately assembled to spool 1 before or after screw 38 is threaded into position.

An important feature of the reel resides in the construction shown Fig. 5 in which the operation of the thumb lever 10 controls the brake, clicker and lock mechanism when the thumb lever is moved to each of three positions respectively. Figs. 6, 7 and 8 illustrate the positions of the elements involved when the thumb lever is in each of the aforesaid positions.

When the thumb lever 10 is in the central dotted position 10' shown Fig. 5, the pin 66 shown Fig. 6 is in its mid position engaged with the cam portion 75 of detent lever 61 and urged therein by the tension of the end portion 64 of spring 58. The pawl portion 53 of yoke 24 is held in spaced relation from the hub 20 by pin 67 in engagement with the forked portion of yoke 24. Thus the level 10 is held in a neutral position against the restraining action of spring 58 and the spool is free to rotate in either direction as required for casting or rewinding the line.

When the lever 10 shown Fig. 5 is moved into its upper position through a distance 76 from the neutral position as shown Fig. 5 and referring to Fig. 7, the pins 66 and 67 will have rotated in a clockwise direction permitting yoke 24 under the influence of spring 58 to move the pawl tip 77 into engaging position with notches 21 in the hub 20 and the pin 66 disengaged from detent cam 75. When the thumb lever is in this upper position, the resulting ratchet operation substantially locks the spool against counter rotation and for the convenient movement and transport of the rod without danger of unwinding of the line with resultant entanglement.

When the lever 10 is depressed by the thumb key 12 to the full line position shown Fig. 5, and referring to Fig. 8, the pins 66 and 67 will rotate to their extreme counter clockwise position against the restraining action of spring 58 which will move the braking portion 54 of yoke 24 into frictional contact with the outer periphery of hub 20 for the purpose of braking the rotation of the spool and/or locking the spool which is the position for applying tension to the line and reducing and stopping the outward travel of the line for playing a catch. The degree of braking is proportionate to the thumb pressure applied to the lever 10.

Thus the three operations of the reel for casting, fishing, playing the catch and reeling in are under the simple control of the thumb of the hand holding the rod. The additional operations such as the setting of the drag for otherwise controlling the line and the operation of the crank for reeling in may readily be accomplished with the user's free hand.

The large diameter of the line receiving chamber permits the use of monofilament line without kinking and provides rapid reeling-in without gears between the handles 3 and the spool. In casting the bait, the lever is preferably in the full line position of Fig. 5 and ready upon the application of thumb pressure toward the rod handle, that is, pressure which naturally accompanies a tighter hand grip on the rod, to snub the spool. After the cast, the thumb may readily raise the lever into the lock position, and thereafter, when a fish may strike, the tightening of the hand on the rod which occurs as a reflex action moves the lever, through thumb pressure, into the snubbing position to permit playing the fish. The reel is thus completely controllable as to the locking, ratcheting, and snubbing actions, and the release of such actions, by the one hand which holds the rod, only reeling-in and drag adjustment being performed by the other hand.

Figure 9:
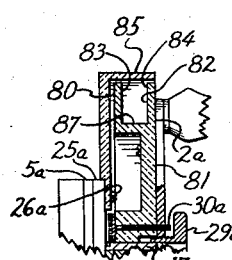
Fig. 9 is a fragmentary sectional end view of a portion of a spool and housing therefor in accord with a modification of the invention.
Figure 10:
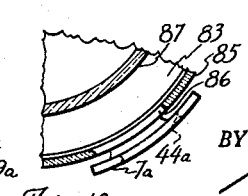
Fig. 10 is a fragmentary sectional side view of a portion of the reel and housing and of the line guide, in accord with the modification of Fig. 6.

In the modified construction of Figs. 9 and 10, the outer winding portions of the spool differ from the arrangement of the above described embodiment and a separate fixed shield member 80 is added to the structure, but in other respects the reel may be identical to that of Figs. 1–8.

The parts in Figs. 9 and 10 which are identical to those above described have been given corresponding reference characters but including the suffix "*a*." The spool 81 is mounted on a hub 17*a* and has a hand wheel 29*a* to bear against drag push rod 30*a*, all as previously described, but the winding cavity 82 is U-shaped, being defined within straight side walls 83 and 84. A dish-like cover or shield 80 is mounted by means of the screws, such as screw 26*a*, which hold cup 25*a* to plate 5*a*, and the cover 80 has a forwardly extending peripheral flange or lip 85 covering the winding cavity and terminating substantially flush with the front face 2*a* of the spool.

As seen in Fig. 10, a slot 86 is formed through flange 85 in alignment with the slot 44*a* of guide 7*a*, and these slots cooperate to guide the line into, and from, the winding cavity centrally between the walls 83 and 84 and onto the inner wall or bottom 87 of the winding surface.

The modified construction provides substantially complete housing of the line on the spool. The braking, locking and clicker operation in the modified reel are identical to those of the first embodiment.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. In a fishing reel a means forming a frame, a spool means journalled for rotation on said frame about its principal axis for retaining a line wound thereon, a cylindrical hub integral with and extending coaxial from said spool having a plurality of recesses on the periphery thereof, a thumb lever for controlling said spool means pivoted on said frame for predetermined movement in opposite directions from a neutral position, a yoke member pivoted on said frame for oscillating movement normal to said axis having an integral pawl arm and an integral brake arm straddling said hub and positioned for alternate engagement with the periphery thereof when said yoke member is operated, a torsion spring secured to said frame having one end thereof affixed to said yoke constructed to urge the pawl arm thereof into ratchet engagement with said recesses on said hub, a projection on said lever in cooperative engagement with said yoke adapted and constructed to alternately move each said arm thereof from a neutral position into braking and ratchet engagement with said hub respectively when said lever is manually moved into each of said opposite directions, a detent lever pivotally secured to said frame, a second projection on said control lever positioned for camming engagement with said detent lever when said yoke is moved into said neutral position, the opposite end of said spring means positioned and shaped to urge said detent lever into said camming engagement with said second projection for holding said lever in said neutral position.

2. In a fishing reel a means forming a frame, a spool means journalled for rotation on said frame about its principal axis for retaining a line wound thereon, a cylindrical hub integral with and extending coaxial from said spool having a plurality of recesses on the periphery thereof, a yoke member pivoted on said frame for oscillating movement normal said axis having an integral pawl arm and an integral brake arm straddling said hub and positioned for alternate engagement with the periphery thereof when said yoke member is operated, spring means biased between said frame and said yoke for urging the said pawl arm into ratchet engagement with said recesses on said hub, a lever for controlling said yoke member pivoted on said frame for predetermined movement and being articulated with said yoke for alternately moving each said arm thereof from a neutral position into braking and ratchet engagement with said hub respectively when manually operated, detent means on said frame and said lever for retaining said lever and said yoke in said neutral position against the urging action of said spring means, said detent means comprising a detent lever pivotally secured to said frame, and abutment on said control lever positioned for camming engagement with said detent lever when the said yoke is moved into said neutral position, spring means adapted and constructed to normally urge said detent lever into said camming engagement with said abutment for holding said lever in said neutral position.

References Cited in the file of this patent

UNITED STATES PATENTS

| | | |
|---|---|---|
| 756,751 | Wallace | Apr. 5, 1904 |
| 2,300,650 | Clinton | Nov. 3, 1942 |
| 2,305,171 | Jones | Dec. 15, 1942 |
| 2,309,146 | Whistler | Jan. 26, 1943 |
| 2,477,073 | McGill | July 26, 1949 |
| 2,572,319 | Clarke | Oct. 23, 1951 |
| 2,610,002 | Surber | Sept. 9, 1952 |
| 2,635,713 | McFarland | Apr. 21, 1953 |
| 2,648,506 | Kirby | Aug. 11, 1953 |
| 2,656,993 | Dukes | Oct. 27, 1953 |

FOREIGN PATENTS

| | | |
|---|---|---|
| 544,351 | France | June 21, 1922 |
| 14,415 | Great Britain | 1905 |